H. McI. SPENCER.
GUANO DISTRIBUTER.
APPLICATION FILED JUNE 30, 1910. RENEWED FEB. 20, 1911.
988,220.
Patented Mar. 28, 1911.
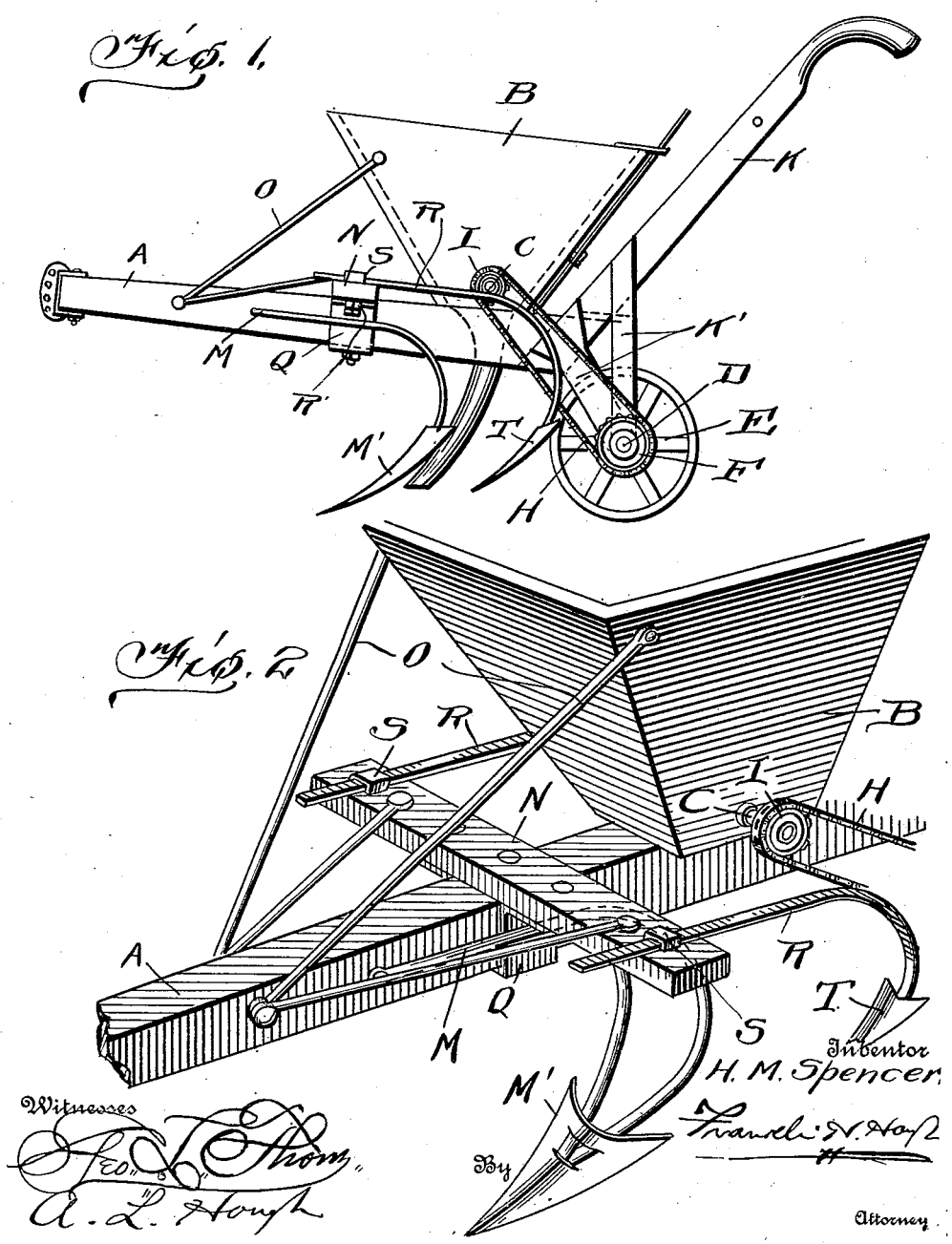

UNITED STATES PATENT OFFICE.

HENRY McIVER SPENCER, OF CHERAW, SOUTH CAROLINA.

GUANO-DISTRIBUTER.

988,220.  Specification of Letters Patent.  Patented Mar. 28, 1911.

Application filed June 30, 1910, Serial No. 569,782. Renewed February 20, 1911. Serial No. 609,738.

*To all whom it may concern:*

Be it known that I, HENRY M. SPENCER, a citizen of the United States, residing at Cheraw, in the county of Chesterfield and State of South Carolina, have invented certain new and useful Improvements in Guano-Distributers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in guano distributers and especially in the provision of a cross-piece fastened to the beam of the apparatus and provided with resilient plow carrying members adjustably held upon the cross-piece and adapted to yield as the plows come into contact with an obstruction.

The invention comprises various details of construction and combinations and arrangements of parts which will be hereinafter fully described and then specifically defined in the appended claims.

I illustrate my invention in the accompanying drawings, in which:—

Figure 1 is a side elevation of a guano distributer made in accordance with my invention, and Fig. 2 is an enlarged detail perspective view of the invention.

Reference now being had to the details of the drawings by letter, A designates the beam of the apparatus having the guano containing hopper B mounted thereon and in which is a stirrer mounted upon the shaft C. Mounted upon a driving shaft or axle D is a wheel E, and F is a pulley or sprocket wheel keyed to the shaft D and has belted or chain connections H with a pulley or sprocket wheel I mounted upon the stirrer shaft C. The handles K are fastened to the beam and suitably braced by the strips K'. The box is securely reinforced by means of the braces O fastened at their lower ends to the beam and their upper ends to the box.

N designates a cross-piece which is mounted upon the beam and positioned preferably a slight distance in advance of the guano holding box and is held upon the beam by the angle iron Q which is recessed to receive the beam and has its ends disposed in alinement with each other and securely fastened to said cross-piece. Fastened upon either side of the beam are the plow carrying rods M to which the plows M' are fastened. Said cross-piece is provided with openings near each end in which the clamping eye bolts S are mounted, and each eye bolt is adapted to receive the shank portion of a resilient bar R carrying a shovel plow T. A nut R' mounted upon the threaded end of each clamping bolt S serves as a means for drawing the bolt so that the bars R will be held frictionally by the marginal opening in the eye bolt and the upper surface of the cross-piece.

The operation of my improved guano distributer will be readily understood and is as follows:—By the provision of the adjustable features shown, the plows mounted upon the resilient bars may be spread or closed accordingly as may be desired for different conditions and the apparatus used for a guano coverer or as a cultivator, as may be desired. As the bars upon which the plows T are mounted are resilient, they will straighten out in the event of the plows carried thereby coming in contact with an obstruction, such as roots, stones, etc., and thus will not necessitate stopping the animal attached to the apparatus to draw the same, the resilient bars being, however, of sufficient rigidity to securely hold the plow in the ground under normal conditions.

What I claim to be new is:—

1. A guano distributer and cultivator comprising a beam, a box thereon, a stirrer and means for operating the same, plows rigidly fastened to the beam, a cross-piece upon said beam and fastened thereto, resilient bars fastened to said cross-piece, and plows carried by the bars.

2. A guano distributer and cultivator comprising a beam, a box thereon, a stirrer and means for operating the same, plows rigidly fastened to the beam, a cross-piece fastened to the beam and having openings therein, eye bolts in said openings, resilient bars adjustably clamped by said eye bolts and cross-piece, and plows secured to said resilient bars.

In testimony whereof I hereunto affix my signature in the presence of two witnesses.

HENRY McIVER SPENCER.

Witnesses:
J. D. EVANS,
JOHN THOMPSON.

Copies of this patent may be obtained for five cents each, by addressing the "Commissioner of Patents, Washington, D. C."